(12) United States Patent
Choi et al.

(10) Patent No.: US 6,299,312 B1
(45) Date of Patent: Oct. 9, 2001

(54) REFLECTION TYPE PROJECTOR

(75) Inventors: Soon-cheol Choi; Han-il Ko, both of Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/515,850

(22) Filed: Feb. 29, 2000

(51) Int. Cl.$^7$ .................................................. G03B 21/14
(52) U.S. Cl. ................................................. 353/31; 353/81
(58) Field of Search .................................. 353/31, 33, 34, 353/37, 81, 69; 349/5, 8; 359/831, 832

(56) References Cited

U.S. PATENT DOCUMENTS

| | | | |
|---|---|---|---|
| 5,820,241 | * 10/1998 | Wortel | 353/31 |
| 5,826,959 | * 10/1998 | Atsuchi | 353/20 |
| 5,973,759 | * 10/1999 | Itoh et al. | 349/5 |
| 6,247,816 | * 6/2001 | Cipolla et al. | 353/31 |

* cited by examiner

*Primary Examiner*—William Dowling
(74) *Attorney, Agent, or Firm*—Sughrue, Mion, Zinn, Macpeak & Seas, PLLC

(57) ABSTRACT

A reflection type projector in which the brightness of light projected onto a screen increases by simultaneously overlapping three colors used for representation of a color image. The reflection type projector includes a light source, first and second dichromatic mirrors arranged on an optical path for transmitting and reflecting input light according to the wavelength thereof, first, second and third image forming devices for generating an image corresponding to each color from input light, a first prism arranged on an optical path between the first dichromatic mirror and the first image forming device, a second prism arranged on an optical path between the second dichromatic mirror and the second image forming device, and a third prism arranged on an optical path between the second dichromatic mirror and the third image forming device. A dichromatic beam splitter is provided having first and second mirror surfaces for selectively transmitting or reflecting light according to the wavelength thereof so that the light input passing the first, second and third prisms is output in one direction. A correction prism is installed on an exit surface of the dichromatic beam splitter for allowing an optical axis of the light input to the dichromatic beam splitter passing each of the first, second and third prisms to be input approximately perpendicular to each of three incident surfaces of the dichromatic beam splitter. A projection lens unit is provided for magnifying and projecting light input from the dichromatic beam splitter toward a screen.

3 Claims, 3 Drawing Sheets

REFLECTION TYPE PROJECTOR

BACKGROUND OF THE INVENTION

1. Field of the Invention

The present invention relates to a reflection type projector using a reflection type image forming device and, more particularly, to a reflection type projector in which three colors used for representation of a color image are overlapped so that brightness of the light projected onto a screen increases.

2. Description of the Related Art

In general, a reflection type projector is for providing an image by projecting an image generated by a reflection type image forming device onto a screen using an additional light source.

A reflection type projector for representing a color image by simultaneously projecting three colors to improve the brightness of image suggested by the present applicant is disclosed in U.S. patent application Ser. No. 09/057,585 (filed on Apr. 9, 1998, entitled "Refection Type Projector" by Soon-cheol Choi). The suggested reflection type projector, as shown in FIG. 1, includes a light source 110 for emitting light, reflecting mirrors 132, 133 and 134, first and second dichromatic mirrors 131 and 135 arranged on an optical path for transmitting or reflecting input light according to the wavelength thereof, first, second and third optical path converting devices 140, 150 and 160 for converting a proceeding path of input light, first, second and third image forming devices 145, 155 and 165 for forming an image from input light, a dichromatic beam splitter 170 for allowing the input light having passed the first, second and third optical path converting devices 140, 150 and 160 to proceed in one direction, and a projection lens unit 180 for magnifying and projecting the light input from the dichromatic beam splitter 170.

The first, second and third optical path converting devices 140, 150 and 160 each include first through third converging lenses 141, 151 and 161 and first through third prisms 143, 153 and 163. Here, to have light input at an angle greater or less than the critical angle, the first through third prisms 143, 153 and 163 include first through third transmission/reflection surfaces 143a, 153a and 163a, respectively, which transmit the light input from the light source 110 and total-reflect the light reflected by the first through third image forming devices 145, 155 and 165.

The dichromatic beam splitter 170 has three incident surfaces 171, 172 and 173 and a single exit surface 174. The three incident surfaces 171, 172 and 173 face the first, second and third optical path converting devices 140, 150 and 160, respectively, and convert a proceeding path of input light having passed each of the first, second and third optical path converting devices 140, 150 and 160 to proceed toward the single exit surface 174. For this, the dichromatic beam splitter 170 has first and second mirror surfaces 176 and 177 for selectively transmitting or reflecting the input light according to the wavelength thereof. The first mirror surface 176 is coated for the transmission or reflection of the input light according to the wavelength thereof so that the input light passing the first optical path converting device 140 is reflected and the input lights passing the second and third optical path converting devices 150 and 160 are transmitted. The second mirror surface 177 is coated for the transmission or reflection of the input light according to the wavelength thereof so that the input lights passing the first and second optical path converting devices 140 and 150 are transmitted and the input light passing the third optical path converting device 160 is reflected. Thus, as the dichromatic beam splitter 170 includes the first and second mirror surfaces 176 and 177, the lights input from three incident surfaces 171, 172 and 173 are output through the single exit surface 174.

The projection lens unit 180 is arranged between the dichromatic beam splitter 170 and a screen (not shown) for magnifying and projecting the light input from the dichromatic beam splitter 170 toward the screen.

The reflection type projector having the above structure, as shown in FIG. 2, is realized into an off-axis optical system in which an illumination optical axis $A_L$ and an optical axis $A_P$ of the projection lens unit are different from each other. Accordingly, the first through third prisms 143, 153 and 163 and the dichromatic beam splitter 170 have such an optical arrangement as that shown in FIG. 2.

Here, when the illumination optical axis $A_L$ crosses a definite line where the first and second mirror surfaces 176 and 177 cross, the efficiency of use of three colors is improved. However, in the above arrangement, as a first FLCD (ferroelectric liquid crystal display)147 of the first image forming device 145 and a second FLCD 157 of the second image forming device are arranged too closely, installation of convergence adjustment devices 149 and 159 for adjusting convergence of the first and second FLCDs 147 and 157 becomes difficult. The reference numeral 167 denotes a third FLCD. Also, as the light input to the three incident surfaces 171, 172 and 173 of the dichromatic beam splitter 170 after passing the first through third prisms 143, 153 and 163 do not make an angle of 90°, the optical arrangement becomes complicated and the first through third prisms 143, 153 and 163 occupy a large space.

SUMMARY OF THE INVENTION

To solve the above problems, it is an objective of the present invention to provide a reflection type projector having a correction prism so that the optical arrangement of the first through third prisms is simplified, the occupied space is minimized, and the installation space of the convergence adjustment device can be easily secured.

Accordingly, to achieve the above objective, there is provided a reflection type projector which comprises a light source for generating and projecting light, a first dichromatic mirror arranged on an optical path for selectively transmitting or reflecting input light according to the wavelength thereof, first, second and third image forming devices for generating an image corresponding to each color from input light, a first prism arranged on an optical path between the first dichromatic mirror and the first image forming device, and having a first transmission/reflection surface for transmitting input light transmitting the first dichromatic mirror and total-reflecting the light reflected by the first image forming device, a second dichromatic mirror for selectively transmitting or reflecting the light reflected by the first dichromatic mirror according to the wavelength thereof, a second prism arranged on an optical path between the second dichromatic mirror and the second image forming device, and having a second transmission/reflection surface for transmitting light reflected by the second dichromatic mirror and total-reflecting the light reflected by the second image forming device, a third prism arranged on an optical path between the second dichromatic mirror and the third image forming device, and having a third transmission/reflection surface for transmitting light transmitting the second dichromatic mirror and total-reflecting the light reflected by the third image forming device, a dichromatic beam splitter having first and second mirror surfaces for selectively transmitting or reflecting light according to the wavelength thereof so that the light input passing the first, second and third prisms is output in one direction, a correction prism installed on an exit surface of the dichromatic beam splitter for allowing an optical axis of the light input to the dichromatic beam splitter passing each of the first, second and third prisms to be input approximately perpendicular to each of three incident surfaces of the dichromatic beam splitter, and a projection lens unit for magnifying and projecting light input from the dichromatic beam splitter toward a screen.

BRIEF DESCRIPTION OF THE DRAWINGS

The above objective and advantages of the present invention will become more apparent by describing in detail a preferred embodiment thereof with reference to the attached drawings, in which.

DETAILED DESCRIPTION OF THE INVENTION

Figure 1:
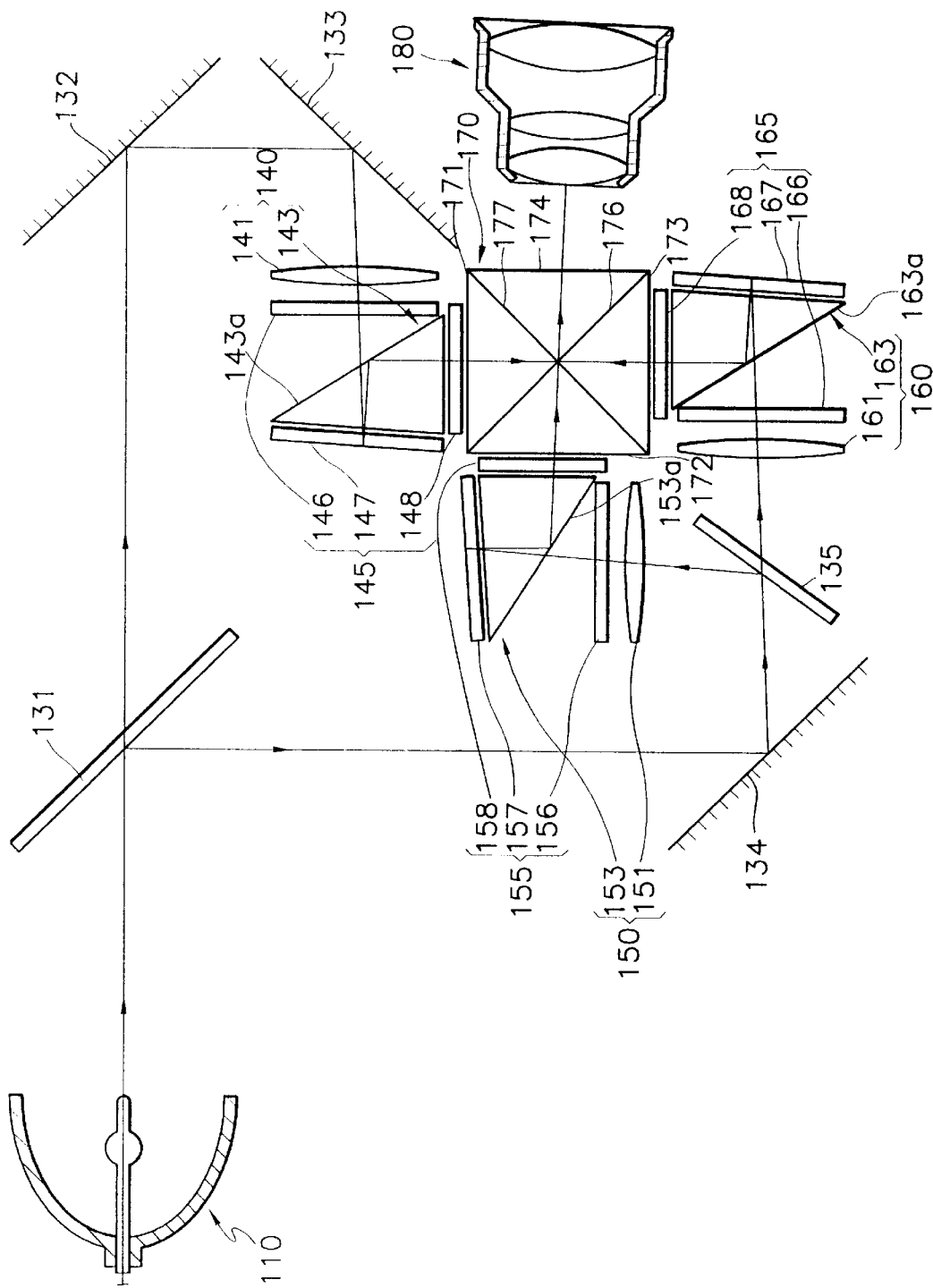
FIG. 1 is a view showing the optical arrangement of the reflection type projector suggested by the present applicant.
Figure 2:
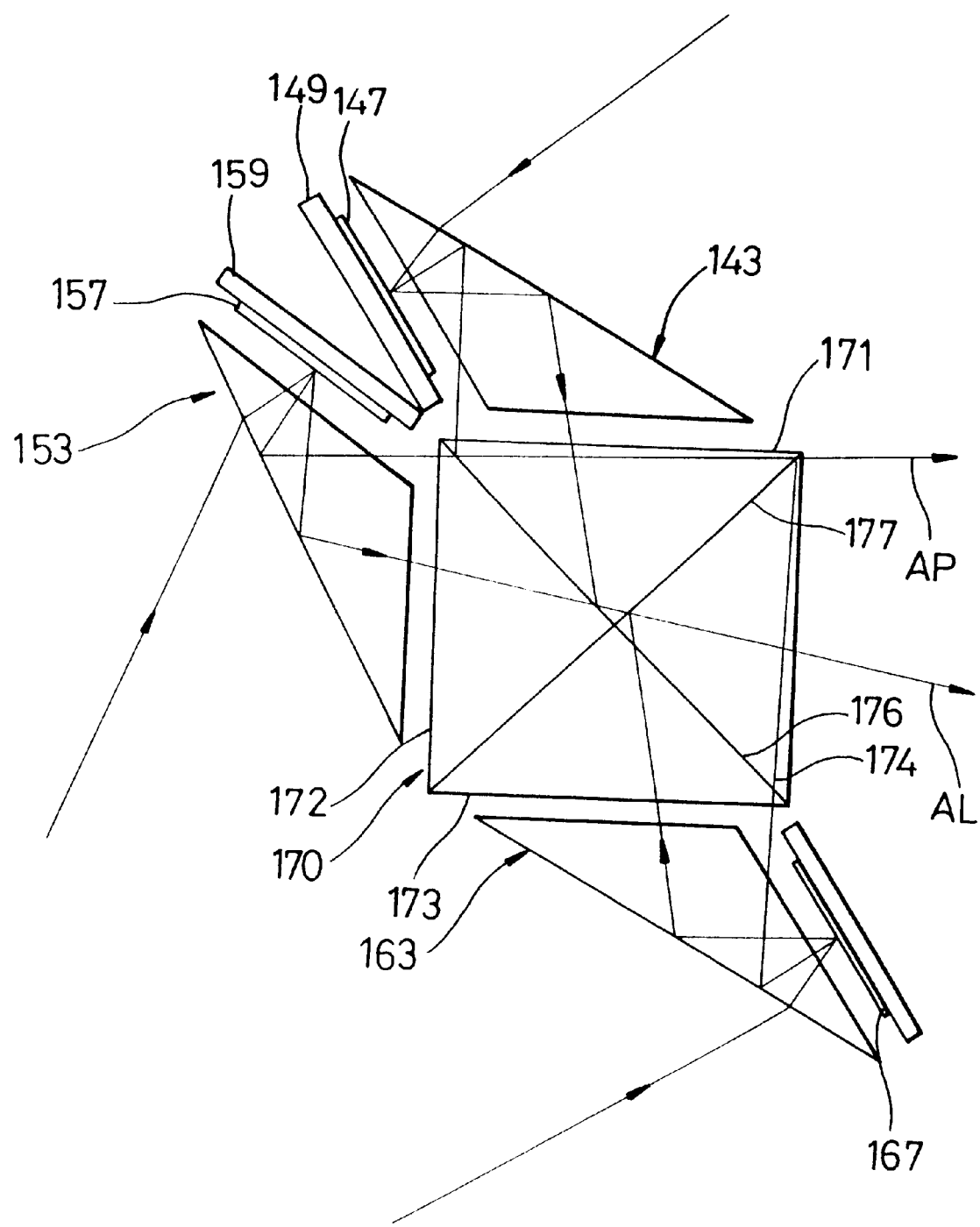
FIG. 2 is a view showing the optical arrangement of the first thorugh third prisms and the dichromatic beam splitter of FIG. 1.
Figure 3:
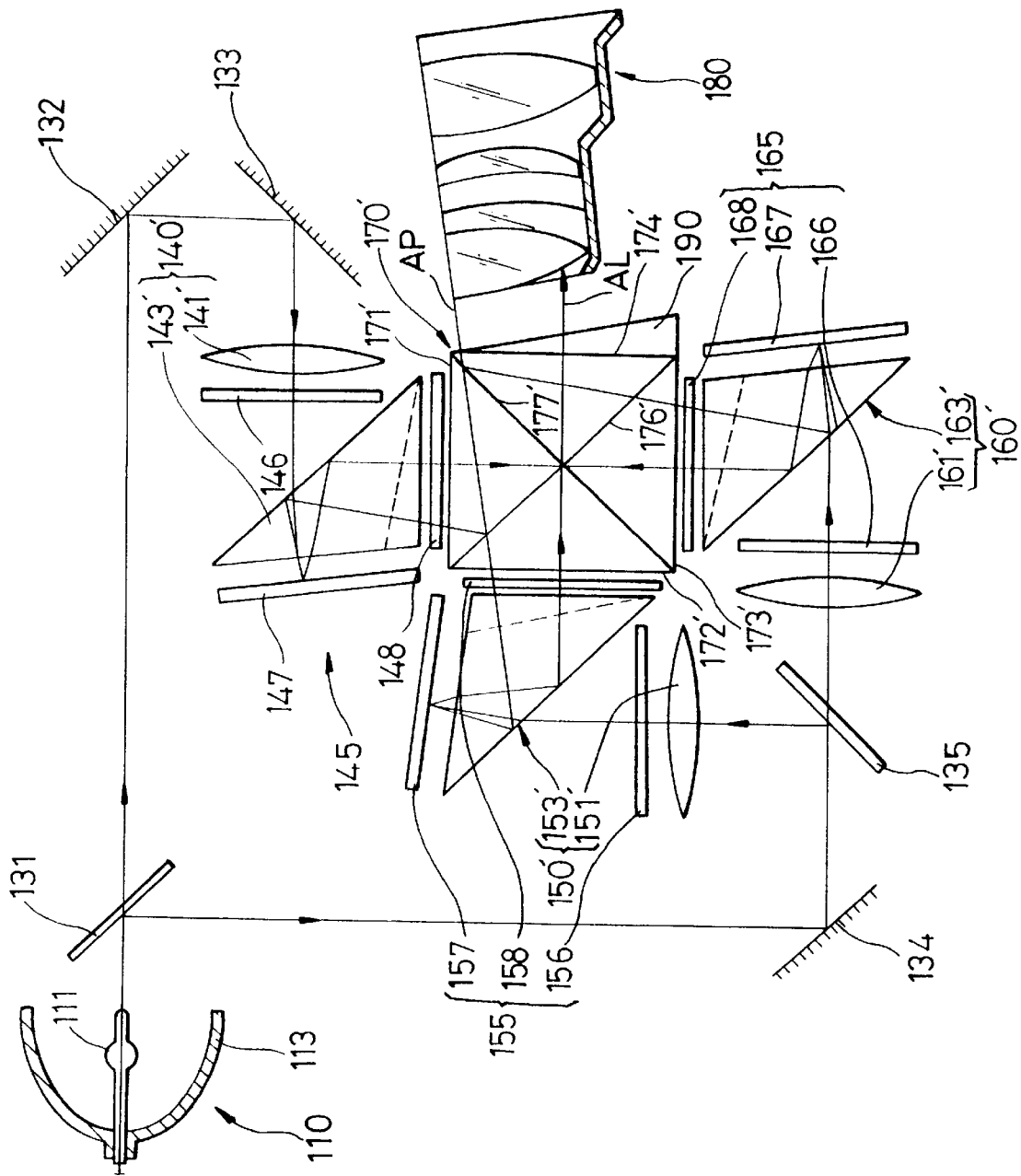
FIG. 3 is a view showing the optical arrangement of a reflection type projector according to a preferred embodiment of the present invention.

Referring to FIG. 3, a reflection type projector according to a preferred embodiment of the present invention includes the light source 110 having a lamp 111 and a reflector 113 for emitting light, reflecting mirrors 132, 133 and 134, first and second dichromatic mirrors 131 and 135 arranged on an optical path for transmitting or reflecting input light according to the wavelength thereof, first, second and third optical path converting devices 140', 150' and 160' for converting a proceeding path of input light, first, second and third image forming devices 145, 155 and 165 for forming an image from input light, a dichromatic beam splitter 170' for allowing the input light having passed the first, second and third optical path converting devices 140', 150' and 160' to proceed in one direction, a correction prism 190 for allowing the illumination optical axis input to the dichromatic beam splitter 170' to be input approximately perpendicular to each of three incident surfaces 171', 172' and 173' and the projection lens unit 180 for magnifying and projecting the light input from the dichromatic beam splitter 170'. Here, the members using the same reference numerals as those in FIGS. 1 and 2 are the same members, so that detailed descriptions thereof will be omitted.

The first optical path converting device 140' converts the proceeding path of light input after transmitting the first dichromatic mirror 131. The first optical path converting device 140' includes a first focusing lens 141' and a first prism 143'. The first focusing lens 141' converts the input diverging light to be a parallel beam. The first prism 143' has a first transmission/reflection surface for transmitting the light input from the first focusing lens 141' and total-reflecting the light reflected by the first image forming device 145.

The second optical path converting device 150' is arranged on the optical path between the second dichromatic mirror 135 and the dichromatic beam splitter 170' and includes a second focusing lens 151' and a second prism 153' for converting the proceeding path of the light reflected by the second dichromatic mirror 135. Here, as the roles and optical arrangement of the second focusing lens 151' and the second prism 153' are the same as those of the first focusing lens 141' and the first prism 143', respectively, a detailed description thereof will be omitted.

The third optical path converting device 160' is arranged on the optical path between the second dichromatic mirror 135 and the dichromatic beam splitter 170' and includes a third focusing lens 161' and a third prism 163' for converting the proceeding path of the light transmitting the second dichromatic mirror 135. Here, as the roles and optical arrangement of the third focusing lens 161' and the third prism 163' are the same as those of the first focusing lens 141' and the first prism 143', respectively, a detailed description thereof will be omitted.

The dichromatic beam splitter 170' has three incident surfaces 171', 172' and 173' and a single exit surface 174'. The three incident surfaces 171', 172' and 173' face the first, second and third optical path converting devices 140', 150' and 160', respectively, and change the light input passing each of the first, second and third optical path converting devices 140', 150' and 160' to proceed toward the single exit surface 174'. For this, the dichromatic beam splitter 170' has first and second mirror surfaces 176' and 177' for selectively transmitting or reflecting the light according to the wavelength thereof. The first mirror surface 176' coated to transmit or reflect the input light according to the wavelength thereof reflects the light input passing the first optical path converting device 140' and transmits the light input passing the second and third optical path converting devices 150' and 160'. The second mirror surface 177' coated to transmit or reflect the input light according to the wavelength thereof transmits the light input passing the first and second optical path converting devices 140' and 150' and reflects the light input passing the third optical path converting device 160'. As the dichromatic beam splitter 170' includes the first and second mirror surfaces 176' and 177', the light imputs through the three incident surfaces 171', 172' and 173' are output through the single exit surface 174'.

The correction prism 190 is preferably provided between the exit surface 174' and the projection lens unit 180 considering the optical arrangement and aberration of the dichromatic beam splitter 170' and the first through third prisms 143', 153' and 163'. Preferably, the correction prism 190 has a wedge shape and is formed by attaching one surface thereof to the exit surface 174'. Also, the correction prism 190 may be integrally formed with the dichromatic beam splitter 170'.

The correction prim 190 can correct the-optical aberration, in particular, chromatism and distortion, according to changes in an optical arrangement of the first through third prisms 143', 153' and 163', the optical axis $A_L$ of the input light passing the first through third prisms 143', 153' and 163' can be perpendicular to each of the three incident surfaces 171', 172' and 173' of the dichromatic beam splitter 170'. Also, the installation space of a convergence adjustment device of the image forming device 145 can be secured. Further, the first through third prisms 143' 153' and 163' can be arranged such that the optical axis $A_L$ of the input light can cross a portion where the first and second mirror surfaces 176' and 177' of the dichromatic beam splitter 170' meet.

As described above, in the reflection type projector according to the present invention, as three colors used for representation of a color image are simultaneously overlapped, the brightness of the light projected onto a screen increases. Also, by modifying the optical structure of the first, second and third prisms by the correction prism, in designing an off-axis optical system in which the optical axes of the input light and the projection lens unit cross each other, the arrangement of the optical axis of the input light to transmit a portion where the first and second mirror surfaces of the dichromatic beam splitter meet is easy.

What is claimed is:

1. A reflection type projector comprising:

a light source for generating and projecting light;

a first dichromatic mirror arranged on an optical path for selectively transmitting or reflecting input light according to a wavelength thereof;

first, second and third image forming devices for generating an image corresponding to each color from input light;

a first prism arranged on an optical path between the first dichromatic mirror and the first image forming device, and having a first transmission/reflection surface for transmitting input light transmitting the first dichromatic mirror and total-reflecting light reflected by the first image forming device;

a second dichromatic mirror for selectively transmitting or reflecting the light reflected by the first dichromatic mirror according to a wavelength thereof;

a second prism arranged on an optical path between the second dichromatic mirror and the second image forming device, and having a second transmission/reflection surface for transmitting light reflected by the second dichromatic mirror and total-reflecting light reflected by the second image forming device;

a third prism arranged on an optical path between the second dichromatic mirror and the third image forming device, and having a third transmission/reflection surface for transmitting light transmitting the second dichromatic mirror and total-reflecting light reflected by the third image forming device;

a dichromatic beam splitter having first and second mirror surfaces for selectively transmitting or reflecting light according to a wavelength thereof so that the light input passing the first, second and third prisms is output in one direction;

a correction prism installed on an exit surface of the dichromatic beam splitter for allowing an optical axis of the light input to the dichromatic beam splitter passing each of the first, second and third prisms to be input approximately perpendicular to each of three incident surfaces of the dichromatic beam splitter; and a projection lens unit for magnifying and projecting light input from the dichromatic beam splitter toward a screen.

2. The reflection type projector as claimed in claim 1, wherein the correction prism is wedge-shaped and one surface thereof is coupled to the exit surface of the dichromatic beam splitter.

3. The reflection type projector as claimed in claim 1, wherein the correction prism is integrally formed with the dichromatic beam splitter.

* * * * *